US012671293B2

(12) United States Patent
Arnault et al.

(10) Patent No.: US 12,671,293 B2
(45) Date of Patent: Jun. 30, 2026

(54) BEARING DEVICE WITH ELECTRICALLY INSULATING LINER AND SOCKET HAVING A CENTRAL PORTION AND A PLURALITY OF TABS

(71) Applicant: AKTIEBOLAGET SKF, Gothenburg (SE)

(72) Inventors: Benoit Arnault, Saint-Cyr-sur-Loire (FR); Mickael Chollet, Joué-lès-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 537 days.

(21) Appl. No.: 18/084,834

(22) Filed: Dec. 20, 2022

(65) Prior Publication Data

US 2023/0223813 A1 Jul. 13, 2023

(30) Foreign Application Priority Data

Jan. 10, 2022 (FR) ...................................... 2200144

(51) Int. Cl.
*H02K 5/173* (2006.01)

(52) U.S. Cl.
CPC ..................................... *H02K 5/173* (2013.01)

(58) Field of Classification Search
CPC .......... H02K 5/16; H02K 5/173; F16C 19/16; F16C 19/52; F16C 19/06; F16C 33/30; F16C 33/38; F16C 33/583; F16C 35/077
USPC .................................................. 310/90, 90.5
See application file for complete search history.

(56) References Cited

U.S. PATENT DOCUMENTS

| | | | | |
|---|---|---|---|---|
| 1,513,295 | A | 10/1924 | Randal | |
| 2,240,285 | A * | 4/1941 | Chamberlin | .......... F16C 27/066 |
| | | | | 384/536 |
| 2,254,277 | A * | 9/1941 | Ehlers | .................... H01R 39/40 |
| | | | | 310/247 |
| 2,283,839 | A * | 5/1942 | Wright | ................ H02K 5/1732 |
| | | | | 384/536 |
| 2,674,505 | A * | 4/1954 | Pfenninger, Jr. | ........ F16C 33/60 |
| | | | | 384/536 |
| 2,986,432 | A * | 5/1961 | Schlauch | .............. F16C 27/066 |
| | | | | 384/536 |

(Continued)

FOREIGN PATENT DOCUMENTS

| | | |
|---|---|---|
| CN | 103780001 A | 5/2014 |
| DE | 102007060968 A1 | 7/2008 |

(Continued)

OTHER PUBLICATIONS

Unpublished U.S. Appl. No. 18/084,812, Benoit Arnault, filed Dec. 20, 2022.

(Continued)

*Primary Examiner* — Maged M Almawri
(74) *Attorney, Agent, or Firm* — J-TEK LAW PLLC; Scott T. Wakeman; Mark A. Ussai

(57) ABSTRACT

A bearing device includes a bearing having a first ring and a second ring mounted for relative rotation and an insulating sleeve mounted on the second ring. The insulating sleeve includes a socket and an electrically insulating liner contacting the second ring. The insulating liner is rigidly secured to the second ring of the bearing and to the socket, and the socket includes at least one protrusion bearing against the insulating liner at least in the axial direction.

18 Claims, 7 Drawing Sheets

(56) References Cited

U.S. PATENT DOCUMENTS

| | | | | |
|---|---|---|---|---|
| 3,447,846 | A * | 6/1969 | Marsh | F16C 27/066 384/536 |
| 3,606,502 | A * | 9/1971 | Germond | F16C 13/006 384/504 |
| 3,876,266 | A * | 4/1975 | Rozentals | F16C 33/588 384/536 |
| 4,511,837 | A | 4/1985 | Vermeiren et al. | |
| 5,044,785 | A * | 9/1991 | Bair | F16C 27/066 384/582 |
| 5,059,041 | A | 10/1991 | Watanabe et al. | |
| 5,375,933 | A * | 12/1994 | Mizutani | F16C 33/62 384/492 |
| 5,632,562 | A * | 5/1997 | Kidzun | F16C 19/466 384/582 |
| 5,857,782 | A * | 1/1999 | Waskiewicz | F16C 19/525 384/493 |
| 5,961,222 | A * | 10/1999 | Yabe | F16C 33/586 384/477 |
| 6,482,140 | B1 * | 11/2002 | Takatsu | B29C 45/14311 384/543 |
| 6,645,415 | B2 * | 11/2003 | Takatsu | F16C 27/066 264/262 |
| 6,715,925 | B2 | 4/2004 | Pairone et al. | |
| 6,964,211 | B1 * | 11/2005 | St. Myer | F16C 35/077 280/779 |
| 7,488,111 | B2 * | 2/2009 | Chen | F16C 27/066 384/537 |
| 7,503,697 | B2 * | 3/2009 | Tsuji | F16C 33/586 384/492 |
| 7,744,284 | B2 * | 6/2010 | Tada | F16C 13/006 384/537 |
| 8,313,240 | B2 * | 11/2012 | Giordana | F16C 33/586 384/448 |
| 8,632,251 | B2 * | 1/2014 | Moratz | F16C 33/7843 384/476 |
| 9,206,841 | B2 * | 12/2015 | Cordier | F16C 43/06 |
| 9,273,772 | B2 | 3/2016 | Ichikawa et al. | |
| 10,050,490 | B1 * | 8/2018 | Hubert | H02K 5/1732 |
| 10,520,029 | B2 * | 12/2019 | Lino | F16C 13/006 |
| 11,002,315 | B2 * | 5/2021 | Stephan | F16C 33/60 |
| 11,204,066 | B2 * | 12/2021 | Feliciano | F16C 37/007 |
| 11,549,556 | B2 * | 1/2023 | Berruet | F16C 19/52 |
| 11,698,106 | B2 * | 7/2023 | Feliciano | F16C 33/62 384/492 |
| 12,158,184 | B2 * | 12/2024 | Zhong | F16C 33/62 |
| 2010/0326788 | A1 * | 12/2010 | Kamm | B65G 39/09 384/582 |
| 2011/0038577 | A1 | 2/2011 | Horling et al. | |
| 2014/0111046 | A1 | 4/2014 | Murikipudi et al. | |
| 2015/0322790 | A1 * | 11/2015 | Yao | F04C 18/38 418/244 |
| 2019/0323558 | A1 | 10/2019 | Stephan | |
| 2020/0047795 | A1 | 2/2020 | Falossi et al. | |
| 2020/0049194 | A1 * | 2/2020 | Zhong | F16C 35/077 |
| 2021/0310520 | A1 * | 10/2021 | Arnault | F16C 35/077 |
| 2023/0220874 | A1 | 7/2023 | Arnault et al. | |
| 2023/0220881 | A1 | 7/2023 | Arnault et al. | |
| 2023/0220882 | A1 | 7/2023 | Arnault et al. | |
| 2024/0026926 | A1 | 1/2024 | Chollet | |

FOREIGN PATENT DOCUMENTS

| | | |
|---|---|---|
| DE | 102007060906 B3 | 10/2009 |
| DE | 102013223677 A1 | 5/2015 |
| DE | 102020106338 A1 | 9/2021 |
| EP | 0417744 A2 | 3/1991 |
| EP | 0417744 B1 | 1/1995 |
| EP | 2258637 A2 | 12/2010 |
| JP | H04210124 A | 7/1992 |
| JP | H1037949 A | 2/1998 |
| JP | 2005320983 A | 11/2005 |
| JP | 2008057568 A | 3/2008 |
| JP | 2013241948 A | 12/2013 |
| JP | 2019138467 A | 8/2019 |
| WO | 2019156050 A1 | 8/2019 |

OTHER PUBLICATIONS

Unpublished U.S. Appl. No. 18/084,824, Benoit Arnault, filed Dec. 20, 2022.
Unpublished U.S. Appl. No. 18/084,840, Benoit Arnault, filed Dec. 20, 2022.
Unpublished U.S. Appl. No. 18/084,812.
Unpublished U.S. Appl. No. 18/084,824.
Unpublished U.S. Appl. No. 18/084,840.
Written Opinion and Search Report from the French Patent Office mailed Aug. 29, 2022 in related French application No. FR2200139, and translation thereof.
Written Opinion and Search Report from the French Patent Office mailed Aug. 29, 2022 in related French application No. FR2200141, and translation thereof.
Written Opinion and Search Report from the French Patent Office mailed Aug. 29, 2022 in related French application No. FR2200142, and translation thereof.
Written Opinion and Search Report from the French Patent Office mailed Aug. 29, 2022 in related French application No. FR2200144, and translation thereof.

* cited by examiner

BEARING DEVICE WITH ELECTRICALLY INSULATING LINER AND SOCKET HAVING A CENTRAL PORTION AND A PLURALITY OF TABS

CROSS-REFERENCE

This application claims priority to French patent application no. 2200144 filed on Jan. 10, 2022, the contents of which are fully incorporated herein by reference.

BACKGROUND

In an electric motor or machine, at least one rolling bearing is mounted between the housing of the electric motor or machine and the rotary shaft so as to support this shaft. In operation, when the shaft is rotating, a difference in electrical potential can arise between the shaft and the housing of the electric motor or machine. This can cause an electric current to flow between the inner ring of the rolling bearing, which is rigidly secured to the shaft, and the outer ring of the rolling bearing, which is rigidly secured to the housing.

The electric current passing through the components of the rolling bearing can damage these components, in particular the rolling elements and the raceways formed on the inner and outer rings. The electrical discharge can also give rise to an undesirable vibration. To overcome these drawbacks, it is known practice to use ceramic rolling elements instead of steel rolling elements (which steel rolling elements are generally made from the same steel as the bearing rings).

Bearings having steel rings and ceramic rolling elements are generally referred to as "hybrid rolling bearings." However, such a hybrid rolling bearing is relatively expensive. It would therefore be desirable to provide a simple and inexpensive way to address the foregoing problems.

SUMMARY

The disclosure is directed to a bearing device comprising a bearing having a first ring and a second ring that can rotate relative to one another.

According to a general feature, the device further comprises at least one insulating sleeve mounted on the second ring of the bearing. The insulating sleeve has a socket and an insulating liner interposed radially between the second ring of the bearing and the socket. The insulating liner is rigidly secured to the second ring and to the socket and is made of an electrically insulating material.

According to another general feature, the socket comprises at least one protrusion bearing against the insulating liner at least in the axial direction.

There is therefore provided a bearing device with integrated electrical insulation which is inexpensive compared to conventional hybrid rolling bearings. Moreover, the device is easy to manufacture and to assemble in the associated electric motor or machine.

Furthermore, the insulating liner is not exposed to impacts as it is arranged radially between the second ring of the bearing and the socket. Moreover, if the insulating liner is made of synthetic material or elastomeric material, the device will be less sensitive to temperature changes. The protrusion or protrusions of the socket make it possible to prevent relative movement between the socket and the insulating liner at least in the axial direction, in particular in the event of temperature changes.

The protrusion or protrusions may be formed by plastic deformation of the socket. This further reduces the cost of producing the bearing device. The protrusion or protrusions may bear axially against the insulating liner or bear obliquely against the insulating liner, in other words in both the axial direction and the radial direction. In one particular embodiment, the protrusion or protrusions of the socket extend at least partially into the electrically insulating material of the insulating liner.

The insulating liner has a radially outer surface and a radially inner surface opposite the outer surface, which delimit the radial thickness of the insulating liner. In one particular embodiment, the protrusion of the socket extends at least partially into a notch of complementary shape formed in one of the outer and inner surfaces of the insulating liner. With such a design, the protrusion or protrusions of the socket also make it possible to prevent circumferential movement between the socket and the insulating liner.

In one embodiment, the insulating liner is overmolded on the second ring of the bearing and on the socket. In this case, the protrusion or protrusions of the socket are at least partially embedded in the electrically insulating material of the insulating liner. With this embodiment, the insulating liner is attached to the second ring and to the socket without any additional element or particular machining of the second ring of the bearing for mounting the insulating liner. It is thus possible to use a bearing having standard first and second rings. This reduces the cost of the device.

The second ring of the bearing comprises a radially outer surface and a radially inner surface opposite the outer surface, which delimit the radial thickness of the second ring. The insulating liner may be interposed radially between the socket and one of the inner and outer surfaces of the second ring.

In one particular embodiment, the socket is made of metal. The socket can thus be easily machined to a predetermined radial tolerance. In one embodiment, the insulating liner covers the whole of the surface of the second ring of the bearing. In this case, the insulating liner entirely covers the surface of the second ring in the axial direction and in the circumferential direction.

According to a first design, the socket delimits the outer surface of the device. In this case, the second ring is the outer ring of the bearing. According to a second alternative design, the socket delimits the inner surface of the device. In this case, the second ring is the inner ring of the bearing.

In one particular embodiment, the bearing comprises at least one row of rolling elements arranged between raceways of the first and second rings. The rolling elements may be made of metal. The invention also relates to an electric motor comprising a housing, a shaft and at least one bearing device as defined above, mounted radially between the housing and the shaft.

BRIEF DESCRIPTION OF THE DRAWINGS

The present invention will be better understood on studying the detailed description of embodiments, given by way of non-limiting examples and illustrated by the appended drawings, in which.

DETAILED DESCRIPTION

Figure 1:
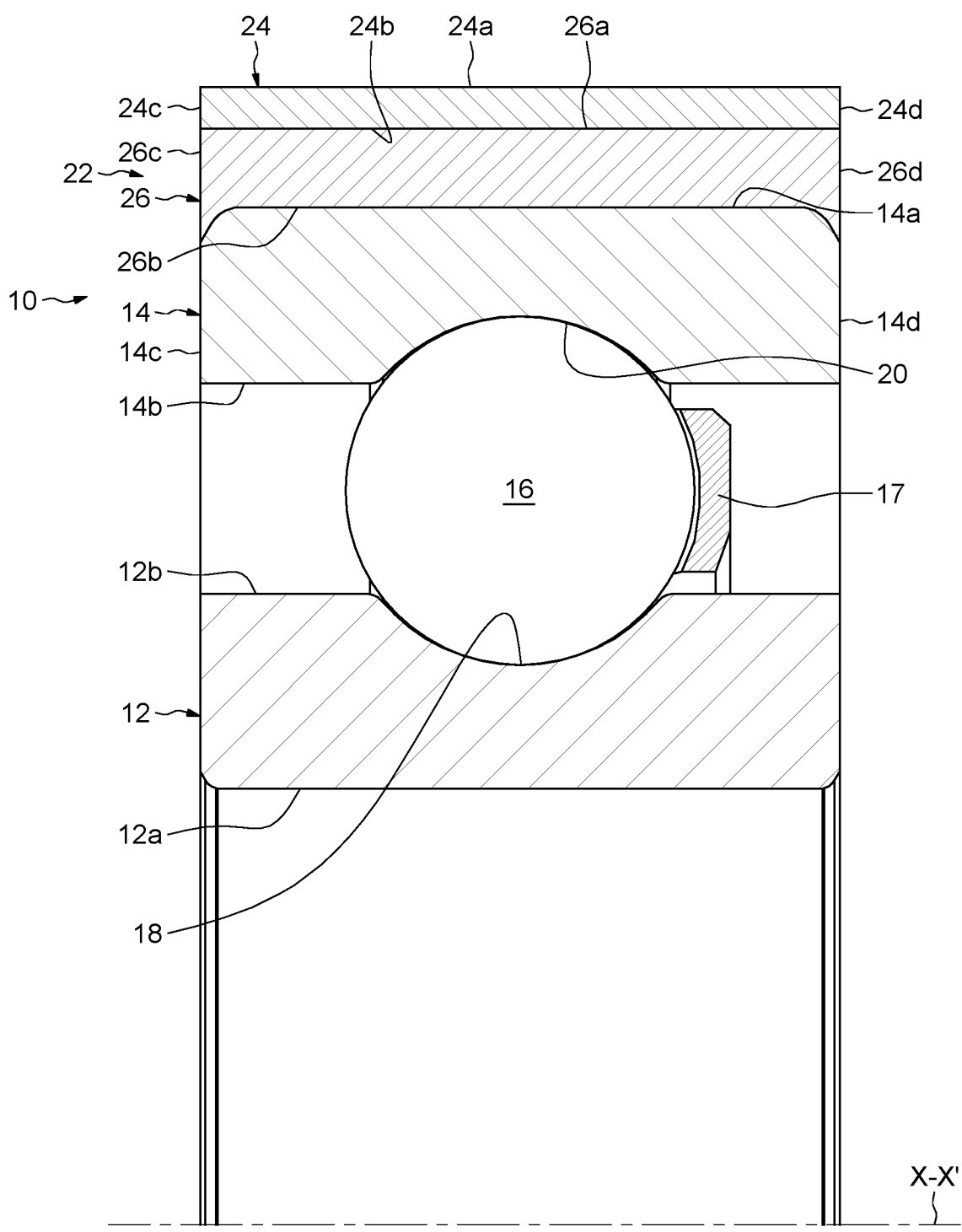
FIG. 1 is a sectional view of a bearing device according to a first embodiment of the present disclosure.
Figure 2:
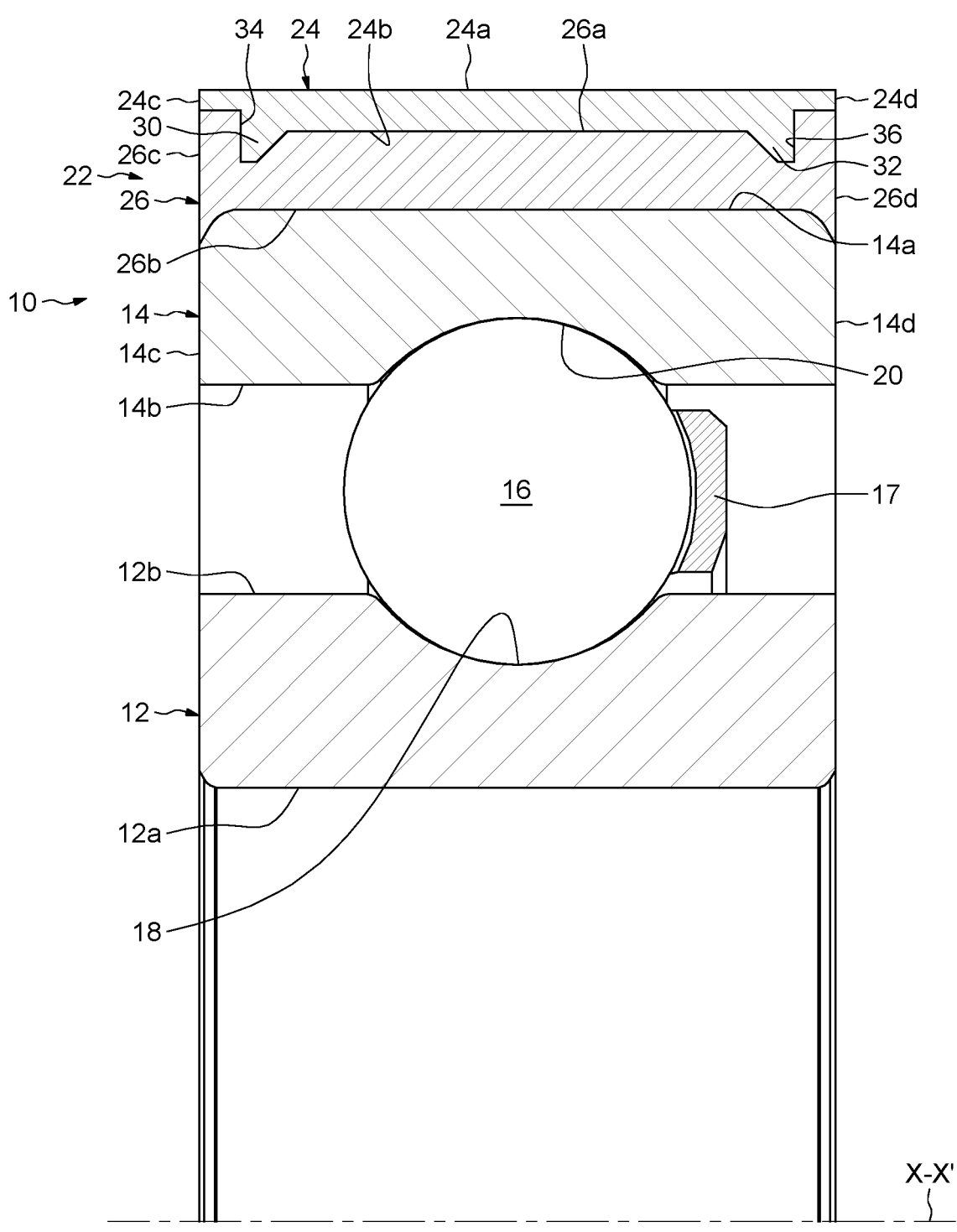
FIG. 2 is a sectional view of the bearing device of FIG. 1 through another sectional plane.

The bearing device shown in FIGS. 1 and 2 comprises a bearing 10 having a first ring 12 and a second ring 14 that can rotate relative to one another about the axis X-X' of the bearing. In the embodiment shown, the first ring 12 is the inner ring of the bearing and the second ring 14 is the outer ring. As described in more detail below, the bearing device is designed in such a way as not to conduct electrical current. The bearing device has integrated electrical insulation.

The inner 12 and outer 14 rings of the bearing are concentric and extend axially along the axis X-X' of the bearing. The inner 12 and outer 14 rings are solid and are made of steel.

In the embodiment shown, the bearing 10 also comprises a row of steel rolling elements 16, in this case balls, interposed radially between the inner 12 and outer 14 rings. The bearing 10 also comprises a cage 17 for maintaining regular circumferential spacing between the rolling elements 16. The bearing 10 may also have seals or sealing flanges.

The inner ring 12 comprises a cylindrical bore 12a, a cylindrical axial outer surface 12b radially opposite the bore, and two radially opposite end faces (not referenced) axially delimiting the bore and the outer surface. The bore 12a and the outer surface 12b delimit the radial thickness of the inner ring 12. The inner ring 12 further comprises an inner raceway 18 for the rolling elements 16 which is formed on the outer surface 12b. The raceway 18 is directed radially outwards.

The outer ring 14 comprises a cylindrical axial outer surface 14a, a cylindrical bore 14b radially opposite the outer surface 14a, and two opposite radial end faces 14c, 14d axially delimiting the bore and the outer surface. The outer surface 14a and the bore 14b delimit the radial thickness of the outer ring 14. The outer ring 14 further comprises an outer raceway 20 for the rolling elements 16 which is formed on the bore 14b. The raceway 20 is directed radially inwards.

The bearing device also comprises an electrically insulating sleeve 22 mounted on the outer ring 14. The insulating sleeve 22 is mounted on the outer surface 14a of the outer ring 14 and rigidly secured to the outer ring 14. The insulating sleeve 22 comprises a socket 24 and an insulating liner 26 interposed radially between the outer ring 14 and the socket 24. The insulating liner 26 is rigidly secured to the outer ring 14 and to the socket 24.

The socket 24 is annular, extends axially and is made in one piece. The socket 24 comprises a cylindrical axial outer surface 24a, a cylindrical bore 24b radially opposite the outer surface 24a, and two opposite radial end faces 24c, 24d axially delimiting the bore and the outer surface. The outer surface 24a and the bore 24b delimit the radial thickness of the socket 24. The outer surface 24a of the socket delimits the outer surface of the bearing device 10. In other words, the outer surface 24a defines the outside diameter of the bearing device 10.

The socket 24 is advantageously made of metal. Thus, the outer surface 24a of the socket can be easily machined to a predetermined tolerance if needed. Preferably, the socket 24 is made of steel. The socket 24 may be obtained from a sheet metal blank by cutting, pressing and rolling. Alternatively, the socket 24 may be obtained from a tube or from forged and/or rolled and/or sintered blanks.

The insulating liner 26 is made of an electrically insulating material. The insulating liner 26 may for example be made of synthetic material, such as polyether ether ketone (PEEK) or nylon-46 (PA46), or may be made of elastomeric material, for example rubber.

The insulating liner 26 is interposed radially between the outer surface 14a of the outer ring and the bore 24b of the socket. The insulating liner 26 covers the outer surface 14a of the outer ring. The insulating liner 26 in this case entirely covers the outer surface 14a with respect to the axial and circumferential directions. The insulating liner 26 also covers the bore 24b of the socket. The insulating liner 26 also in this case entirely covers the bore 24b with respect to the axial and circumferential directions.

The insulating liner 26 is annular and extends axially. The insulating liner 26 comprises a cylindrical axial outer surface 26a, a cylindrical bore 26b radially opposite the outer surface 26a, and two opposite radial end faces 26c, 26d axially delimiting the bore and the outer surface. The outer surface 26a and the bore 26b delimit the radial thickness of the insulating liner 26. The outer surface 26a is in radial contact with the bore 24b of the socket. The bore 26b is in radial contact with the outer surface 14a of the outer ring.

In the embodiment shown, the faces 14c, 26c, 24c of the outer ring, of the insulating liner and of the socket are coplanar and the faces 14d, 26d, 24d of the outer ring, of the insulating liner and of the socket are coplanar.

Other arrangements are also possible. For example, the insulating liner 26 could have a small axial dimension and be axially set back from the faces 14c, 14d of the outer ring. Alternatively, the insulating liner 26 could have a large axial dimension and protrude axially beyond the faces 14c, 14d of the outer ring. In this case, the insulating liner 26 may at least partially cover these faces 14c, 14d. As a variant, the insulating liner 26 could at least partially cover the faces 24c, 24d of the socket.

Figure 3:
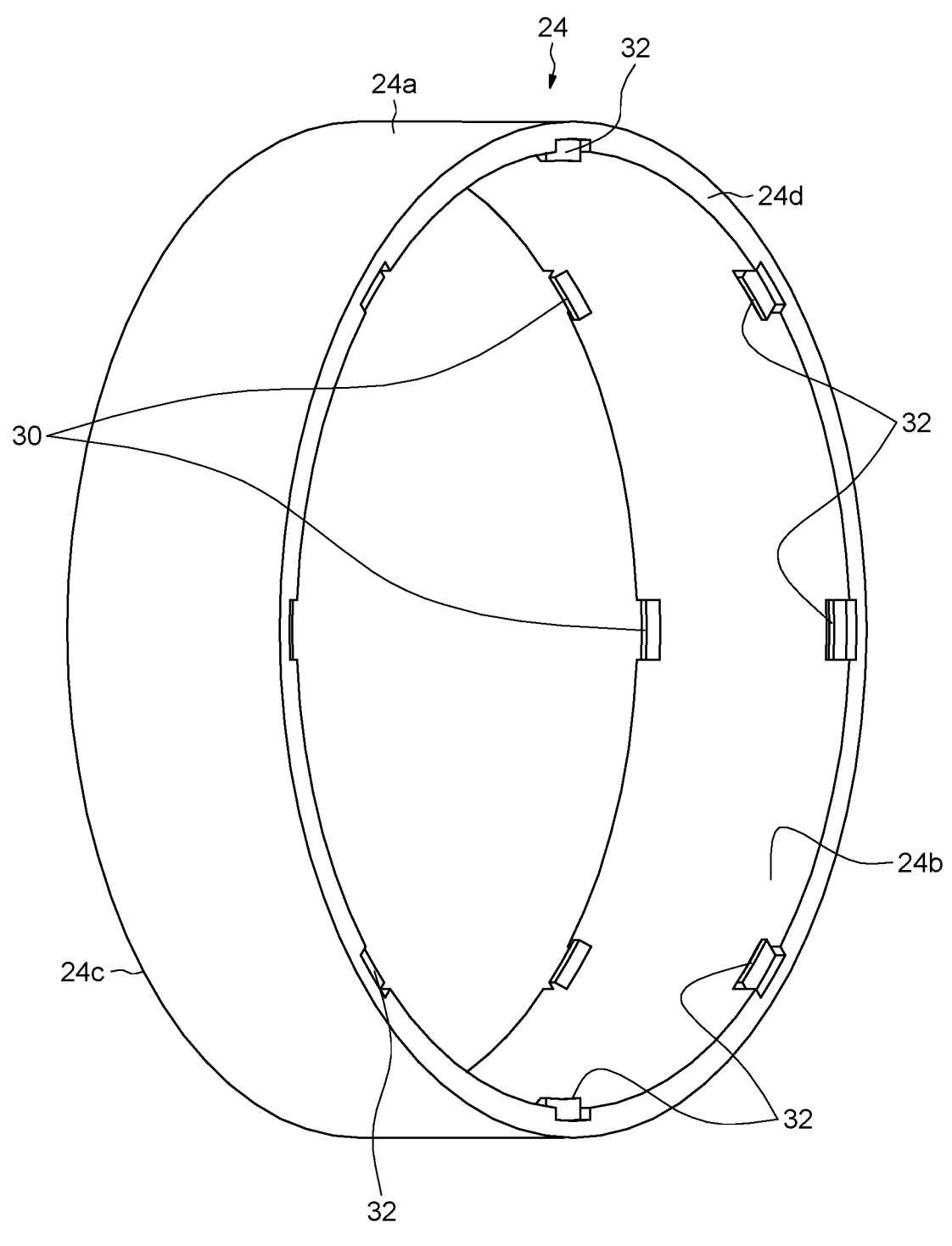
FIG. 3 is a perspective view of a socket of the bearing device of FIGS. 1 and 2.

As can be seen more clearly in FIG. 3, a first group of radial protuberances 30 is made on one axially side of the socket 24, and a second group of radial protuberances 32 is made on the axially opposite side of the socket. The protuberances 30, 32 protrude radially inwards relative to the bore 24b of the socket and form radial protrusions.

The protuberances 30 of the first group are located close to the axially end face 24c of the socket. The protuberances 30 are formed from the end face 24c by locally pushing back material. The protuberances 30 are thus formed by plastic deformation of the socket 24. The protuberances 32 of the second group are located close to the axially end face 24d of the socket. Like the protuberances 30, the protuberances 32 are formed from the end face 24d by locally pushing back material. The protuberances 30, 32 are in this case identical. By way of indication, the protuberances 30, 32 may extend over an angular sector of between 5° and 15°.

In the embodiment shown, the protuberances 30, 32 of a group are regularly spaced apart from one another in the circumferential direction. An irregular circumferential spacing may also be used. In another variant embodiment, a single annular or non-annular protuberance can be provided on each axial side of the socket.

In the embodiment shown, each protuberance 30 of a group is aligned in the circumferential direction with one of the protuberances 32 of the other group. As a variant, the protuberances 30 may be circumferentially offset relative to the protuberances 32.

Referring once again to FIG. 2, the protuberances 30, 32 protrude radially from the side facing the insulating liner 26 and bear axially and radially against the latter. Each protuberance 30, 32 extends into a notch 34, 36 formed in the outer surface 26a of the insulating liner. The protuberances 30, 32 have a shape complementary to the notches 34, 36.

In the embodiment shown, the insulating liner 26 is overmolded on the outer ring 14 of the bearing and on the socket 24. The insulating liner 26 is overmolded on the outer surface 14a of the outer ring 14 and on the bore 24b of the socket 24. The notches 34, 36 in the insulating liner are formed during overmolding. The protuberances 30, 32 on the socket extend into the electrically insulating material of the insulating liner 26. The protuberances 30, 32 are entirely embedded in the electrically insulating material.

A method of producing the bearing device is described below.

In a first step, the bearing 10 and the socket 24 equipped with the protuberances 30, 32 are mounted inside a mold which is provided for overmolding of the insulating liner 26. In this position mounted inside the mold, the socket 24 is radially spaced from the outer ring 14 of the bearing.

Next, during a second successive step, the insulating liner 26 is overmolded both on the outer ring 14 of the bearing and on the socket 24.

Lastly, the bearing device, which is in the form of a unitary assembly, is removed from the mold.

Figure 4:
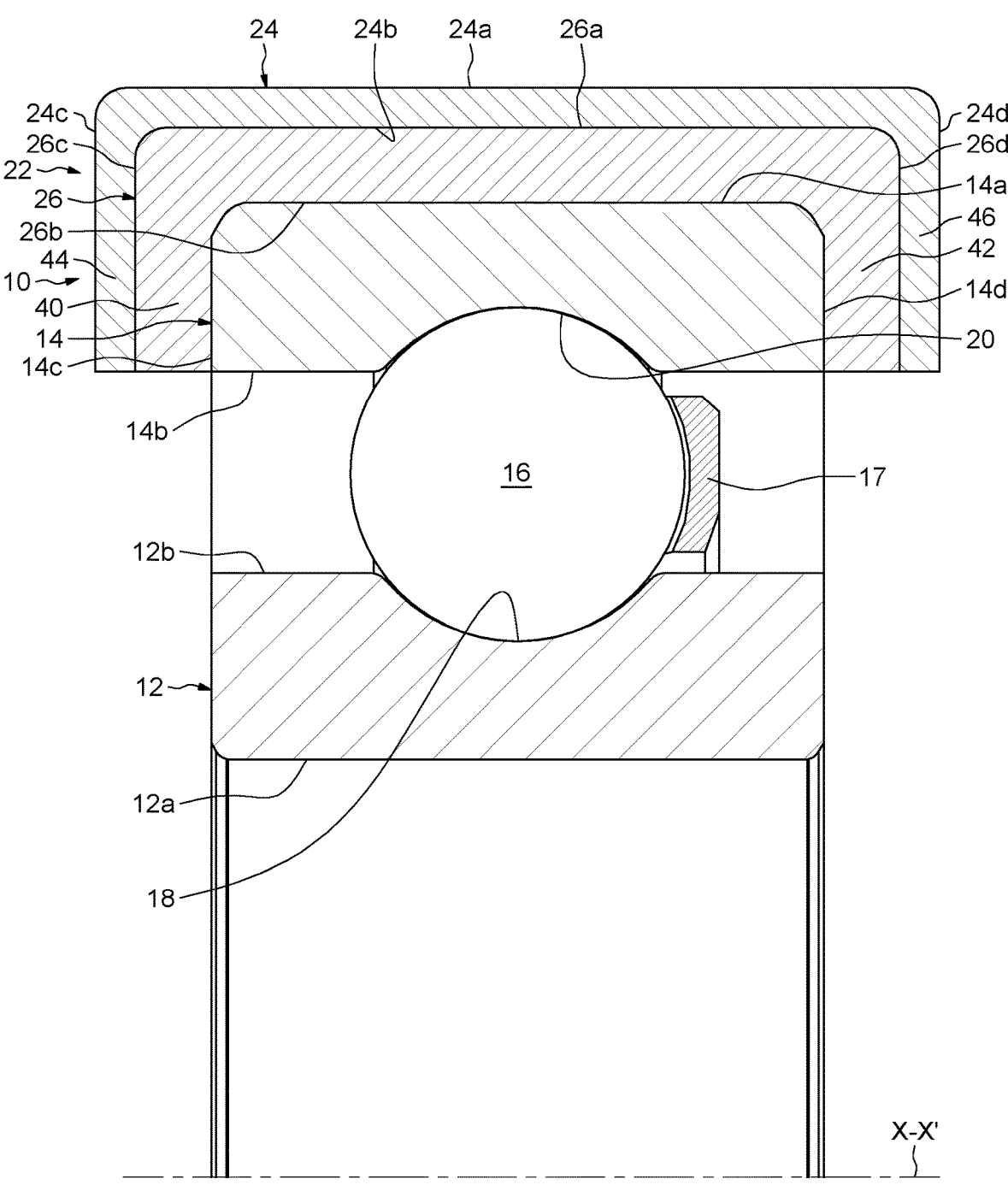
FIG. 4 is a sectional view of a bearing device according to a second embodiment of the present disclosure.

The embodiment shown in FIG. 4, in which identical elements bear the same references, differs from the above embodiment in particular in that the insulating liner 26 comprises two lateral rims 40, 42 respectively bearing axially against the end faces 14c, 14d of the outer ring of the bearing. Each rim 40, 42 forms a radially inward extension of the insulating liner. The rims 40, 42 are annular. In this embodiment, the insulating liner 26 is also made in one piece by overmolding.

In this example, the socket 24 comprises two lateral rims 44, 46 respectively bearing axially against the rims 40, 42 of the insulating liner. The rims 44, 46 bear axially against the rims 40, 42 on the side opposite the outer ring 14 of the bearing. Each rim 44, 46 forms a radially inward extension of the socket and extends radially as far as the inner surface 14b of the second ring. The rims 44, 46 protrude radially inwards relative to the bore 24b of the socket and form radial protrusions. The rims 44, 46 extend radially from the side of the socket 24 facing the insulating liner. The rims 44, 46 are formed by bending the socket. The rims 44, 46 are thus formed by plastic deformation of the socket 24. In this embodiment, the socket 24 is also made in one piece.

The rims 44, 46 are in this case annular. Alternatively, the rims 44, 46 may be in the form of sectors spaced apart from one another in the circumferential direction. In this case, the rims 44, 46 are formed by bending and cutting the socket.

As stated above, the insulating liner 26 is overmolded on the outer ring 14 of the bearing and on the socket 24. Other ways of attaching the insulating liner 26 to the outer ring 14 of the bearing and to the socket 24 are also possible, for example by adhesive bonding if the insulating liner does not have the rims 40, 42. In this case, the rims 44, 46 of the socket may have a small radial dimension.

Figure 5:
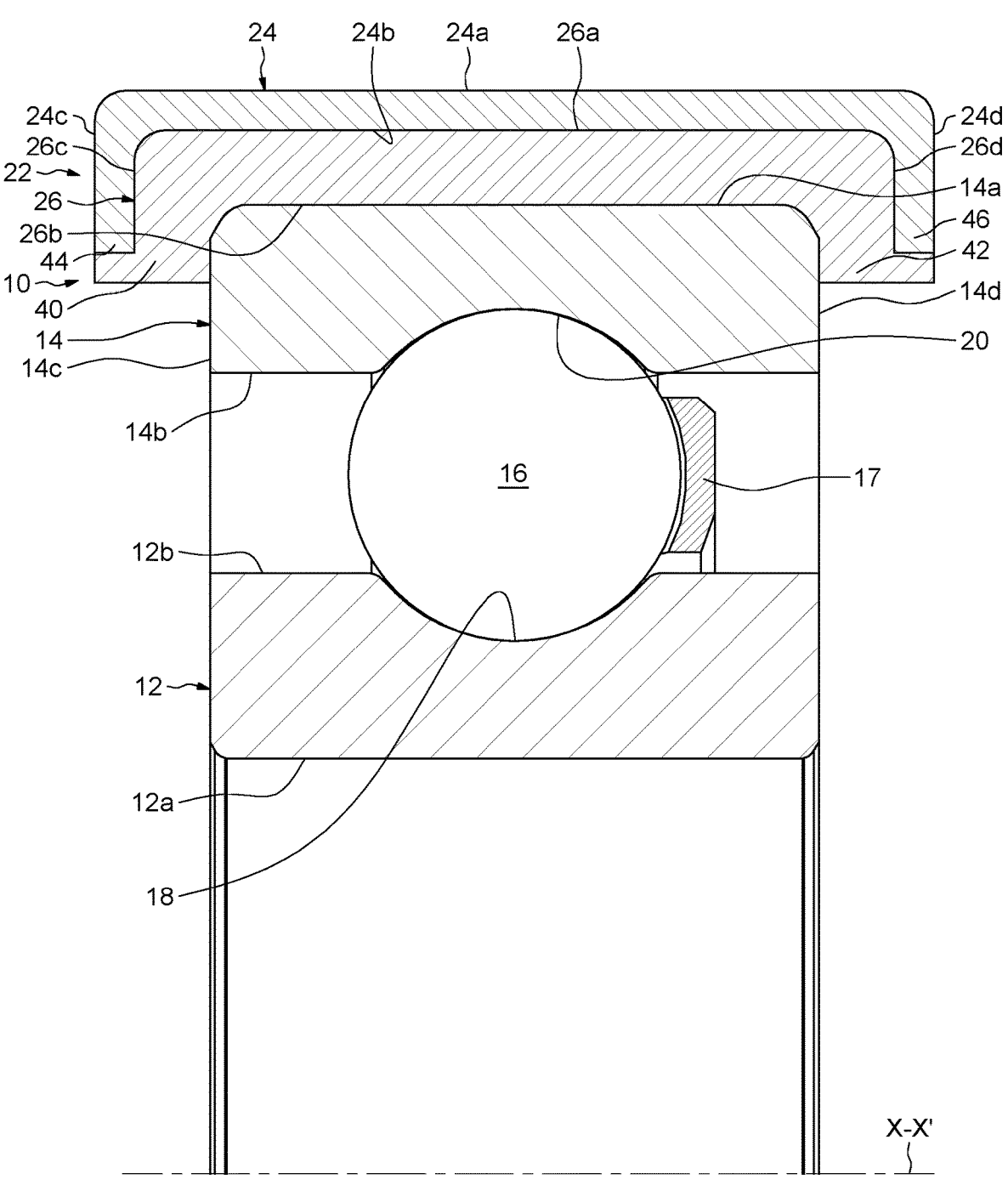
FIG. 5 is a sectional view of a bearing device according to a third embodiment of the present disclosure.

The embodiment shown in FIG. 5, in which identical elements bear the same references, differs from the above embodiment in particular in that the lateral rims 44, 46 of the socket and the rims 40, 42 of the insulating liner have a smaller radial dimension and do not extend radially inward as far as the inner surface 14b of the second ring. In this example, the rims 40, 42 of the insulating liner partially cover the faces 14c, 14d of the outer ring and also cover the inner edges of the rims 44, 46.

Figure 6:
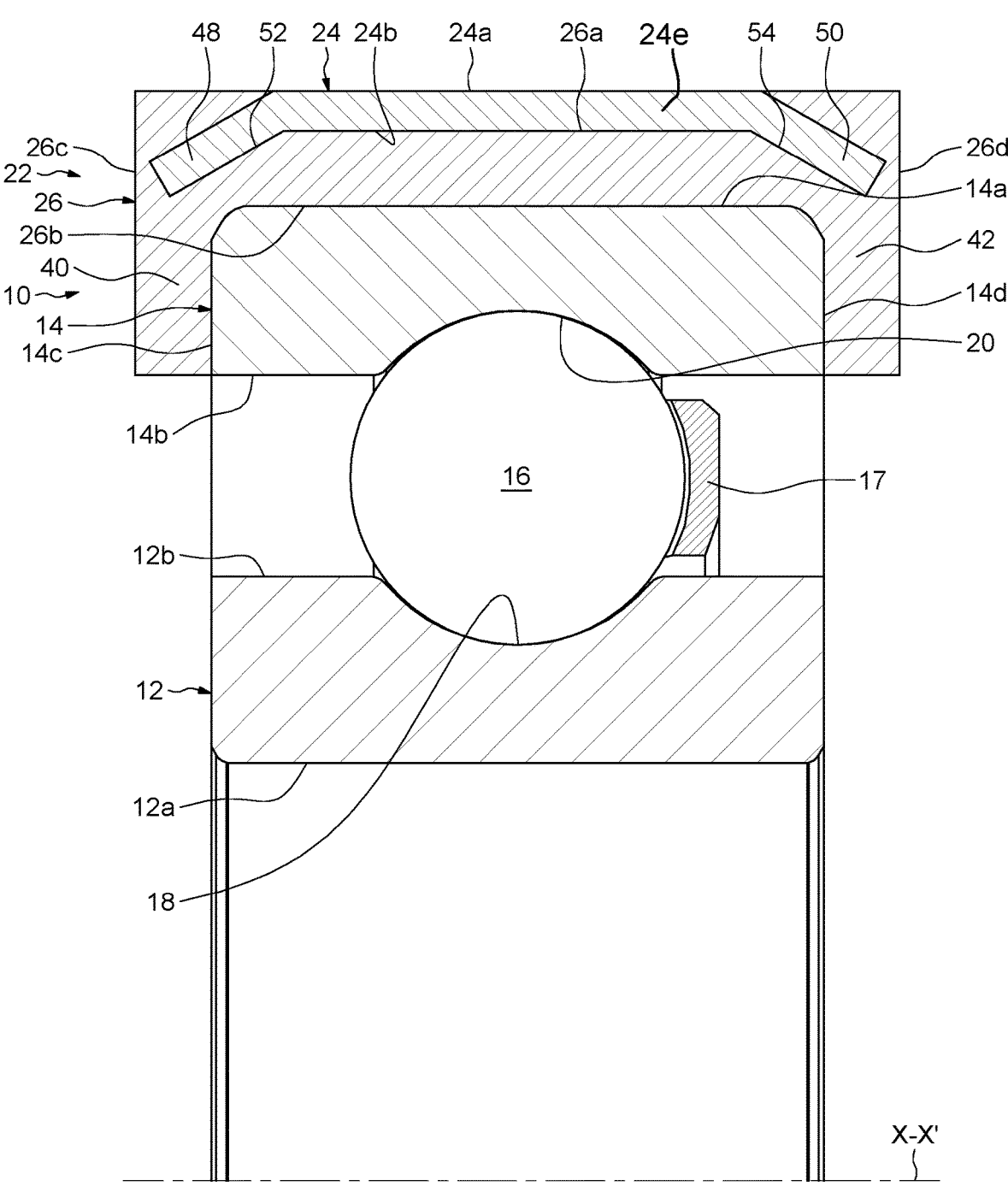
FIG. 6 is a sectional view of a bearing device according to a fourth embodiment of the present disclosure.

The embodiment shown in FIG. 6, in which identical elements bear the same references, differs from the embodiment of FIG. 4 in that the socket 24 includes a central portion 24e, a first group of lateral tabs 48 extending axially from one side of the central portion 24e and a second group of lateral tabs 50 extending axially from the opposite side of the central portion 24e. The tabs 48, 50 protrude obliquely inwards relative to the bore 24b of the socket and thus extend both axially and radially. The tabs 48, 50 form oblique protrusions and bear obliquely against the insulating liner 26. At locations circumferentially between the lateral tabs 48, 50, the central portion may extend axially to the axial edges of the insulating liner.

The tabs 48 of the first group are located close to the axially end face 24c of the socket. The tabs 48 are formed from the end face 24c by cutting and bending. The tabs 48 are thus formed by plastic deformation of the socket 24.

The tabs 50 of the second group are located close to the axially end face 24d of the socket. Like the tabs 48, the tabs 50 are formed from the end face 24d by cutting and bending.

The tabs 48, 50 are in this case identical. By way of indication, the 48, 50 may each extend over an angular sector of between 5° and 15°.

The tabs 48, 50 of a group are regularly spaced apart from one another in the circumferential direction. An irregular circumferential spacing is also possible. In another alternative embodiment, a single annular tab or a tab extending over a more limited angular sector could be provided.

In the embodiment shown, each tab 48 of a group is axially aligned with one of the tabs 50 of the other group. However, the tabs 48 may also be circumferentially offset relative to the tabs 50.

The tabs 48, 50 protrude radially from the side facing the insulating liner 26 and bear against the latter. Each tab 48, 50 extends into a notch 52, 54 formed in the outer surface 26a of the insulating liner. The tabs 48, 50 have a shape complementary to the notches 52, 54.

In the example shown, the insulating liner 26 is overmolded on the outer ring 14 of the bearing and on the socket 24. The insulating liner 26 is overmolded on the outer surface 14a of the outer ring 14 and on the bore 24b of the socket 24. The notches 52, 54 in the insulating liner are formed during overmolding. The tabs 48, 50 on the socket extend into the electrically insulating material of the insulating liner 26. The tabs 48, 50 are entirely embedded in the electrically insulating material.

As in the embodiment of FIG. 5, the rims 40, 42 of the insulating liner may, alternatively, have a smaller radial dimension. That is, the rims 40, 42 may extend radially inward as far as the inner surface 24b of the outer ring or may have a more limited radial extension.

Figure 7:
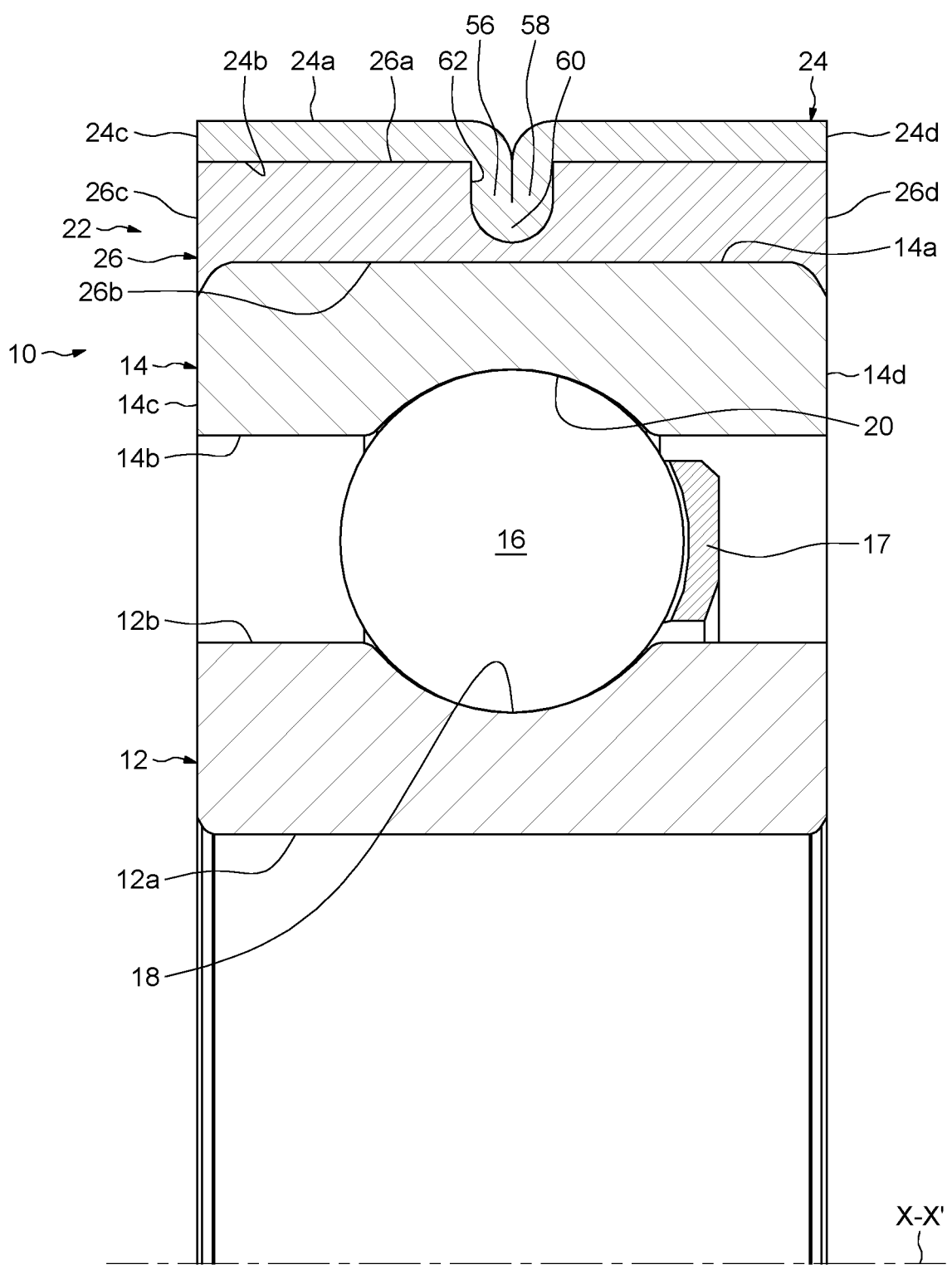
FIG. 7 is a sectional view of a bearing device according to a fifth embodiment of the invention.

The embodiment shown in FIG. 7, in which identical elements bear the same references, differs from the first embodiment in that the socket 24 comprises two annular radial portions 56, 58 extending radially inwards and bearing axially against one another in such a way as to form a fold and locally obtain a double thickness of material. The radial portions 56, 58 are connected to one another by a rounded portion 60. The radial portions 56, 58 are located in a median plane of the socket 24. The radial portions 56, 58 are in this case identical.

The radial portions 56, 58 of the socket protrude radially inwards toward the bore 24*b* of the socket. The radial portions 56, 58 form radial protrusions and are formed by pressing.

The radial portions 56, 58 of the socket protrude radially from the side facing the insulating liner 26 and bear axially and radially against the latter. The radial portions 56, 58 extend into a notch 62 formed in the outer surface 26*a* of the insulating liner. The radial portions 56, 58 have a shape complementary to the notch 62.

In the embodiment shown, the insulating liner 26 is overmolded on the outer ring 14 of the bearing and on the socket 24. The insulating liner 26 is overmolded on the outer surface 14*a* of the outer ring 14 and on the bore 24*b* of the socket 24. The notch 62 is formed during overmolding. The radial portions 56, 58 of the socket extend into the electrically insulating material of the insulating liner 26. The radial portions 56, 58 are entirely embedded in the electrically insulating material.

In this embodiment, the insulating liner 26 is flush with the end faces 14*c*, 14*d* of the outer ring of the bearing. Alternatively, the insulating liner 26 could receive at least partially the end faces 14*c*, 14*d* of the outer ring of the bearing.

As stated above, in the embodiments shown, the first ring 12 of the bearing is the inner ring and the second ring 14 to which the insulating sleeve 22 is attached is the outer ring. Alternatively, the second ring 14 to which the insulating sleeve is attached may be the inner ring. In this case, the insulating sleeve is mounted in the bore 12*a* of the inner ring. The insulating liner is then interposed radially between the bore 12*a* of the inner ring and the outer surface of the socket. The bore of the socket delimits the bore of the bearing device.

In the embodiments described, the bearing of the device has a single row of rolling elements. The bearing may as a variant have several rows of rolling elements. Furthermore, the rolling bearing may include other types of rolling elements other than balls, for example rollers. In another variant, the bearing may be a sliding bearing without any rolling elements.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved insulated bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

What is claimed is:

1. A bearing device comprising:
a bearing including a first ring and a second ring mounted for relative rotation; and
an insulating sleeve mounted on the second ring, the insulating sleeve comprising a socket and an electrically insulating liner contacting the second ring,
wherein the insulating liner is rigidly secured to the second ring of the bearing and to the socket,
wherein the socket comprises a central portion and a plurality of tabs extending obliquely away from the central portion,
wherein the socket is made of metal,
wherein the first plurality of tabs and the second plurality of tabs do not contact the second ring, and
wherein the metal socket is electrically insulated from the second ring.

2. The bearing device according to claim 1,
wherein each of the plurality of tabs is formed by plastic deformation of the socket.

3. The bearing device according to claim 1,
wherein the insulating liner has an outer surface and an inner surface opposite the outer surface delimiting a radial thickness of the insulating liner, each of the plurality of tabs extending at least partially into a respective notch having a shape complementary to a shape of the respective tab, each notch being formed in the insulating liner.

4. The bearing device according to claim 1,
wherein the insulating liner is overmolded on the second ring of the bearing and on the socket.

5. The bearing device according to claim 1,
wherein the plurality of tabs comprises a first set of tabs extending from a first axial side of the central portion and a second plurality of tabs extending from a second axial side of the central portion.

6. The bearing device according to claim 1,
wherein the insulating liner is made of synthetic material or of elastomeric material.

7. The bearing device according to claim 1,
wherein the second ring of the bearing comprises an outer surface and an inner surface opposite the outer surface delimiting a radial thickness of the second ring, the insulating liner being interposed radially between the socket and the inner surface of the second ring or the outer surfaces of the second ring.

8. The bearing device according to claim 1, in which the second ring is an outer ring of the bearing and the first ring is an inner ring.

9. An electric motor comprising a housing, a shaft and at least one bearing device according claim 1 mounted radially between the housing and the shaft.

10. The bearing device according to claim 1,
wherein each of the plurality of tabs is bent out of the central portion to leave unbent portions of the central portion circumferentially between the tabs.

11. The bearing device according to claim 10,
wherein the plurality of tabs comprises a first set of tabs extending from a first axial side of the central portion and a second plurality of tabs extending from a second axial side of the central portion.

12. The bearing device according to claim 11, wherein the tabs of the first set of tabs are circumferentially offset from the tabs of the second set of tabs.

13. The bearing device according to claim 11, wherein each of the plurality of tabs has a circumferential width of 5° to 15°.

14. The bearing device according to claim 11, wherein the tabs of the first set of tabs are equally circumferentially spaced.

15. The bearing device according to claim 11, wherein the insulating liner is overmolded on the second ring of the bearing and on the socket, wherein each of the plurality of tabs has a circumferential width of 5° to 15°, wherein the tabs of the first set of tabs are equally circumferentially spaced, and wherein the insulating liner comprises an elastomeric material.

16. An electric motor comprising a housing, a shaft and at least one bearing device according claim 15 mounted radially between the housing and the shaft.

17. A bearing device comprising:
a bearing including a first ring and a second ring mounted for relative rotation; and
an insulating sleeve mounted on the second ring, the insulating sleeve comprising a metal socket and an electrically insulating liner overmolded between the socket and the second ring and connecting the socket to the second ring, wherein the socket comprises an annular central portion and a first plurality of circumferentially spaced tabs extending from a first axial side of the central portion and a second plurality of tabs extending from a second axial side of the central portion, wherein each of the first and second plurality of tabs has a surface facing the second ring, wherein the surfaces of the first plurality of tabs facing the inner ring lie on an imaginary cone, wherein the surfaces of the second plurality of tabs facing the inner ring lie on the imaginary cone wherein the first plurality of tabs do not contact the second ring and the second plurality of tabs do not contact the second ring, and wherein the metal socket is electrically insulated from the second ring.

18. The bearing device according to claim 17, wherein each tab of the first plurality of tabs is axially aligned with a respective tab of the second plurality of tabs, and wherein a line perpendicular to a first one of the first plurality of tabs and a line perpendicular to a first one of the second plurality of tabs axially adjacent to the first one of the first plurality of tabs intersect on a side of the second ring radially opposite the socket.

* * * * *